Patented Feb. 15, 1949

2,462,009

UNITED STATES PATENT OFFICE 2,462,009

AMINO TRIMETHYL HEXENOIC ACIDS AND THEIR LACTAMS

Rupert C. Morris, Berkeley, and Alva V. Snider, Richmond, Calif., assignors to Shell Development Company, San Francisco, Calif., a corporation of Delaware No Drawing. Application July 18, 1944, Serial No. 545,550

8 Claims. (Cl. 260—239)

This invention relates to certain novel nitrogen-containing compounds and to a method for their production. More particularly it pertains to 6-amino trimethyl hexenoic acids and to their lactams, and to a method for their production which comprises forming the oxime of isophorone, reacting the said oxime with a rearranging agent, thereby forming the lactams of the 6-amino trimethyl hexenoic acids, and hydrolyzing the said lactams to form the free 6-amino trimethyl hexenoic acids when such acids are desired as the end products.

The novel lactams and amino acids of the invention are useful for a variety of purposes. They are particularly useful for the synthesis of polyamide-type resins and as plasticizers for polymeric substances. The lactams are useful as insecticides, and as constituents of insecticide compositions. The amino acids represent a novel type of such compounds which may be used in biochemical research. Since the compounds contain several functional groups, i. e. the carboxyl, amino, and olefinic groups, they may be used as raw materials for the synthesis of a wide variety of other useful organic compounds. Commercial use of the compounds of the invention is practical and advantageous from an economic standpoint, since as will be shown hereinbelow the compounds may be economically prepared from isophorone which is a readily available and inexpensive starting material.

The novel compounds of the invention may be prepared by a process which essentially comprises forming the oxime of isophorone, reacting the said oxime with a rearranging agent, thereby forming the lactams of the 6-amino trimethyl hexenoic acids, and treating the said lactams with a hydrolytic reagent in order to form the desired acids. The first step in this series of reactions, i. e. the formation of the oxime of isophorone, may be readily effected by reacting isophorone with a salt of hydroxylamine, e. g. hydroxylamine hydrochloride, in the presence of an equivalent amount of an alkaline material, e. g. sodium carbonate or sodium hydroxide. In large scale operation, however, the oxime may preferably be prepared by reacting isophorone with sodium nitrite, sodium bisulfite and sulfur dioxide until the reaction is complete and the isophorone has been substantially completely converted to isophorone oxime. The reaction mixture may then be neutralized with a base such as sodium hydroxide and the isophorone oxime separated from the neutralized mixture.

The isophorone oxime prepared in this manner may be readily converted to the lactams of the invention by subjecting it to the action of a base such as sodium hydroxide or of other rearranging agents such as phosphorous pentachloride, phosphorous pentasulfide, phosphorous pentoxide, para-toluene sulfonyl chloride and para-toluene sulfonic acid. Strong mineral acids such as hydrochloric acid and sulfuric acid, particularly sulfuric acid, represent preferred reagents for effecting the rearrangement. The conversion of isophorone oxime may be carried out by heating a quantity of oxime with sulfuric acid having a concentration of from about 75% to about 98% sulfuric acid, the oxime and the acid being used in a ratio which lies within the range of between about ½ part by weight of oxime to about 1 part by weight of sulfuric acid and ½ part by weight of oxime to about 20 parts by weight of acid, a preferred ratio being about 1 part of oxime to about 3 parts of 85% sulfuric acid. If desired, an inert solvent such as chloroform, carbon tetrachloride or other alkyl halides, the paraffin hydrocarbons and the like, may be added to the reaction mixture. Heating of the reaction mixture may be continued until the reaction begins, e. g. at a temperature of from about 85° C. to about 90° C. The reaction may then be allowed to proceed spontaneously until it is nearly complete, whereupon the reaction mixture may be heated to a temperature of not more than about 200° C., preferably about 195° C., for a time sufficient to complete the rearrangement. The reaction mixture may then be cooled and kept cool during the addition of a basic material in an amount sufficient to neutralize the acid content of the reaction mixture. Suitable basic materials comprise sodium hydroxide, potassium hydroxide, the alkaline earth metal hydroxides, particularly calcium hydroxide, sodium carbonate, potassium carbonate, sodium bicarbonate and the like. The cold neutralized material may then be filtered to remove the salt which is formed by the neutralization. The lactam product may be separated from the filtrate by extraction with chloroform, carbon tetrachloride, ethyl chloride, ethyl bromide, ether, hydrocarbon solvents, such as octane or benzene, or other suitable solvents. The solvent may then be separated from the resulting solution of lactam and solvent, and the lactam isolated in a pure condition by distillation under diminished pressure, fractional crystallization, or other suitable means. If desired, they may be further purified by a second distillation and/or crystallization from an organic solvent.

It will be apparent that the nature of the lactam product formed by rearrangement of the oxime will depend upon the direction of cleavage of the 6-membered carbon ring under the influence of the rearranging agent. The rearrangement may take place, for example, in such a fashion as to form the lactam of 6-amino-3,3,5-trimethyl-5-hexenoic acid:

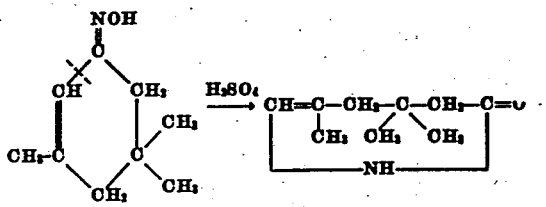

The reaction may also proceed, however, to effect the introduction of a nitrogen atom between the carbon atom of the oxime group and the carbon atom of the ring structure which is adjacent to the dimethyl-substituted carbon atom, in which case the lactam of 6-amino-3,5,5-trimethyl-2-hexenoic acid is formed:

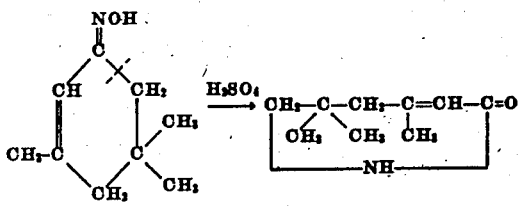

Which of these two products is formed or which predominates in a mixture of the two isomers formed as a product of the reaction is determined by the nature of the rearranging agent employed and the operating conditions such as the temperature, pressure, presence or absence of catalyzing materials, relative amounts of reactants, etc. Under the ordinary conditions of reaction, a mixture of the two isomeric lactams is usually produced. This mixture may per se be applied to many uses, or, if desired, it may be fractionally distilled or otherwise treated to separate the mixture into its component isomers.

The free amino acids may be prepared from the lactams obtained by the said rearrangement step by treating the said lactams with any reagent capable of converting a lactam to an amino acid. This may be accomplished, for example, by reacting the lactam with barium hydroxide, thereby forming the desired amino acid. A preferred procedure comprises hydrolyzing the lactam with a dilute solution of a mineral acid, e. g. a 10% solution of sulfuric acid used in an amount which is slightly more than that required to form a salt, e. g. a sulfate, with the amino acid produced by the hydrolytic reaction. After the hydrolysis is complete, the reaction mixture may be cooled and a quantity of a reagent which will neutralize the acid content of the hydrolytic mixture may be added thereto. Thus, when the hydrolysis is being effected through the agency of sulfuric acid, the sulfuric acid present in the reaction mixture may be neutralized by reaction with barium hydroxide, thereby forming an insoluble precipitate of barium sulfate which may be removed by filtration, leaving a solution of the desired amino acid. This solution may be concentrated by evaporation and the amino acid separated therefrom. It will be apparent that when an individual lactam is employed as a starting material an individual acid will be obtained as a product. Thus the lactam of 6-amino-3,3,5-trimethyl-5-hexenoic acid yields upon hydrolysis 6-amino-3,3,5-trimethyl-5-hexenoic acid, while the lactam of 6-amino-3,5,5-trimethyl-2-hexenoic acid yields upon hydrolysis 6-amino-3,5,5-trimethyl-2-hexenoic acid. When the mixture of the two isomeric lactams which may be formed as a product of the rearrangement of isophorone oxime is employed as a starting material for the hydrolytic step, a mixture of the two corresponding hexenoic acids may be formed as a product, the two isomeric acids being present in relative proportions corresponding to the relative amounts of the isomeric lactams present in the mixture used as a starting material. This mixture of acids may be used as such for most purposes, although, if desired, it may be separated into its constituent isomers by any suitable means, as by fractional distillation, fractional crystallization, etc. If desired, the 6-amino-trimethyl-hexenoic acids of the invention may be prepared in the form of their acid salts, e. g. their hydrochlorides. Thus, the hydrochlorides of the 6-amino-trimethyl-hexenoic acids may be prepared by dissolving the lactams in a suitable solvent, e. g. moist ether, and saturating the resulting solution with gaseous hydrogen chloride. This usually results in the formation of a precipitate comprising the desired amino acid salt which may be separated from the solvent, dried, and purified by crystallization from a suitable solvent.

The process of the invention may be illustrated by the following examples wherein the parts are by weight.

*Example I*

The oxime of isophorone was prepared by reacting isophorone with an excess of hydroxylamine hydrochloride and an amount of sodium carbonate which was approximately equivalent to the amount of hydroxylamine hydrochloride used. The oxime product was distilled. It boiled at 96° C. at 1 mm. After recrystallization from an octane solvent it melted at 82° C.

About 1 part of the oxime prepared in this manner was mixed with about 3 parts of 85% sulfuric acid and the reaction started by heating the resulting mixture to a temperature of about 80° C. When the spontaneous reaction had ceased, heating was resumed to raise the temperature of the reaction mixture to about 195° C. After maintaining the mixture at this temperature for about 15 minutes, the reaction mixture was cooled to about 0° C. and neutralized with an aqueous potassium hydroxide solution containing about 24% potassium hydroxide. The potassium sulfate formed by the neutralization was removed by filtration. The filtrate and the potassium sulfate were then extracted with chloroform and the combined extracts distilled. This resulted in the isolation of the lactam product which boiled at about 130° C. at 1 mm. Upon recrystallization from octanes a white crystalline product was obtained which melted at 106° C. to 107° C. and analyzed 9.09% N (theory, 9.15% N).

*Example II*

The lactam product prepared as in Example I was dissolved in moist ether and the resulting ether solution saturated with gaseous hydrogen chloride. The hydrochlorides of the 6-amino-trimethyl-hexenoic acids separated almost immediately in the form of a crystalline solid which was filtered and dried. The melting point of the solid product was 92° C. to 96° C. It analyzed 7.0% N (theory 6.8% N) and was slightly hygroscopic, very soluble in water and insoluble in benzene. The yield was approximately quantitative.

Example III

About 1 part of the lactam prepared as in Example I, 2 parts of barium hydroxide octahydrate and 10 parts of water were refluxed overnight. Carbon dioxide was bubbled through the solution to precipitate the excess barium hydroxide. The barium carbonate that formed was filtered and the water solution concentrated nearly to dryness. On standing the crystalline 6-amino-trimethyl-hexenoic acids separated. This solid product was washed with octane and ether to remove any unchanged lactam. The insoluble crystalline acid fraction melted at 157° C. to 159° C. and analyzed 7.4% N (theory 7.4% N).

This compound is slightly hygroscopic, very soluble in water and miscible with ether and benzene. On heating at atmospheric or reduced pressures it dehydrates to yield the lactam.

As indicated hereinabove, the novel lactams and amino acids of the invention have properties which make them unique and especially suitable for varied uses. The presence of the quaternary carbon atom and of the three alkyl groups, i e. the three methyl groups, on the carbon chain imparts to polymers formed by polymerization of the 6-amino-trimethyl-hexenoic acid highly desirable characteristics. The resulting polyamides have, for example, much better solubility characteristics and are much more elastic than are the polyamides derived from the straight chain parent compound epsilon-amino caproic acid. The presence of the methyl groups also imparts desirable solubility characteristics to the lactams and to the corresponding amino acids. These compounds are, for example, more readily soluble in hydrocarbon solvents than are the 6-amino-hexenoic acid lactams or the 6-amino-hexenoic acids. This fact is of importance when it is desired to prepare insecticidal sprays by incorporation of the lactams in a hydrocarbon solvent such as kerosene. The branched chain structure in the presently disclosed compound is also of interest from a biochemical standpoint, since the branched chain compounds have physiological properties which are different from the properties of the straight chain amino acids. The presence of the double bond in the unsaturated compounds which are described herein also gives these compounds distinctive physical and chemical characteristics and enables their use in the synthesis of a variety of useful derivatives. It is also of great importance from a technical standpoint that the rearrangement of isophorone oxime by reaction between the oxime and a mineral acid such as sulfuric acid takes place much more smoothly and slowly than does the rearrangement of the simpler oximes such as cyclohexanone oxime. As is well known the rearrangement of cyclohexanone oxime to form 6-amino-hexenoic acid lactam takes place with almost explosive violence. This necessitates carrying out the reaction in a batch manner, using very small amounts of oxime starting material. It also entails loss of product, discoloration of product through overheating, etc. Treatment of isophorone oxime with sulfuric acid, on the other hand, gives rise to relatively slow and smooth reaction which may be readily controlled and which leads to the formation of high yields of a very pure product. The reaction may be carried out on a large scale, using relatively large quantities of oxime with attendant economy of operation.

We claim as our invention:

1. A compound selected from the group consisting of a 6-amino trimethyl hexenoic acid lactam having the methyl groups attached to the No. 3 and the No. 5 carbon atoms of the lactam, and its corresponding hydrolysis product, a 6-amino trimethyl hexenoic acid having the methyl groups attached to the No. 3 and the No. 5 carbon atoms of the carbon chain.

2. A 6-amino trimethyl hexenoic acid having the methyl groups attached to the No. 3 and the No. 5 carbon atoms of the carbon chain.

3. 6-amino-3,3,5-trimethyl-5-hexenoic acid.

4. A 6-amino trimethyl hexenoic acid lactam having the methyl groups attached to the No. 3 and the No. 5 carbon atoms of the lactam.

5. 6-amino-3,3,5 - trimethyl - 5 - hexenoic acid lactam.

6. 6-amino-3,3,5 - trimethyl - 2 - hexenoic acid lactam.

7. A process for the production of a 6-amino trimethyl hexenoic acid which comprises reacting isophorone oxime with sulfuric acid having a concentration of about 85% at a temperature of between about 80° C. and about 200° C., thereby forming a 6-amino trimethyl hexenoic acid lactam, and hydrolyzing the said lactam by reaction with a dilute mineral acid to form a 6-amino trimethyl hexenoic acid.

8. A process for the production of a mixture of the lactams of 6-amino-3,5,5-trimethyl-2-hexenoic acid and 6-amino-3,3,5-trimethyl-5-hexenoic acid which comprises reacting isophorone oxime with approximately 85% sulfuric acid at a temperature of between about 80° C. and about 200° C., thereby forming the desired mixture of 6-amino-3,5,5-trimethyl-2-hexenoic acid lactam and 6-amino-3,3,5-trimethyl-5-hexenoic acid lactam.

RUPERT C. MORRIS.
ALVA V. SNIDER.

REFERENCES CITED

The following references are of record in the file of this patent:

UNITED STATES PATENTS

| Number | Name | Date |
|---|---|---|
| 2,071,253 | Carothers | Feb. 16, 1937 |
| 2,130,948 | Carothers | Sept. 20, 1938 |
| 2,221,369 | Cass | Nov. 12, 1940 |
| 2,241,321 | Schlack | May 6, 1941 |
| 2,313,026 | Schlack | Mar. 2, 1943 |
| 2,327,119 | Martin | Aug. 17, 1943 |

OTHER REFERENCES

Heilbron, "Dictionary of Organic Compounds," vol. II; page 445 (Oxford University Press; New York; 1943).

Eck et al., Jour. Biol. Chem., vol. 106, pages 387–391 (1934).